April 18, 1950     H. R. GROSS     2,504,327
LAMP MOUNTING
Filed Nov. 14, 1947
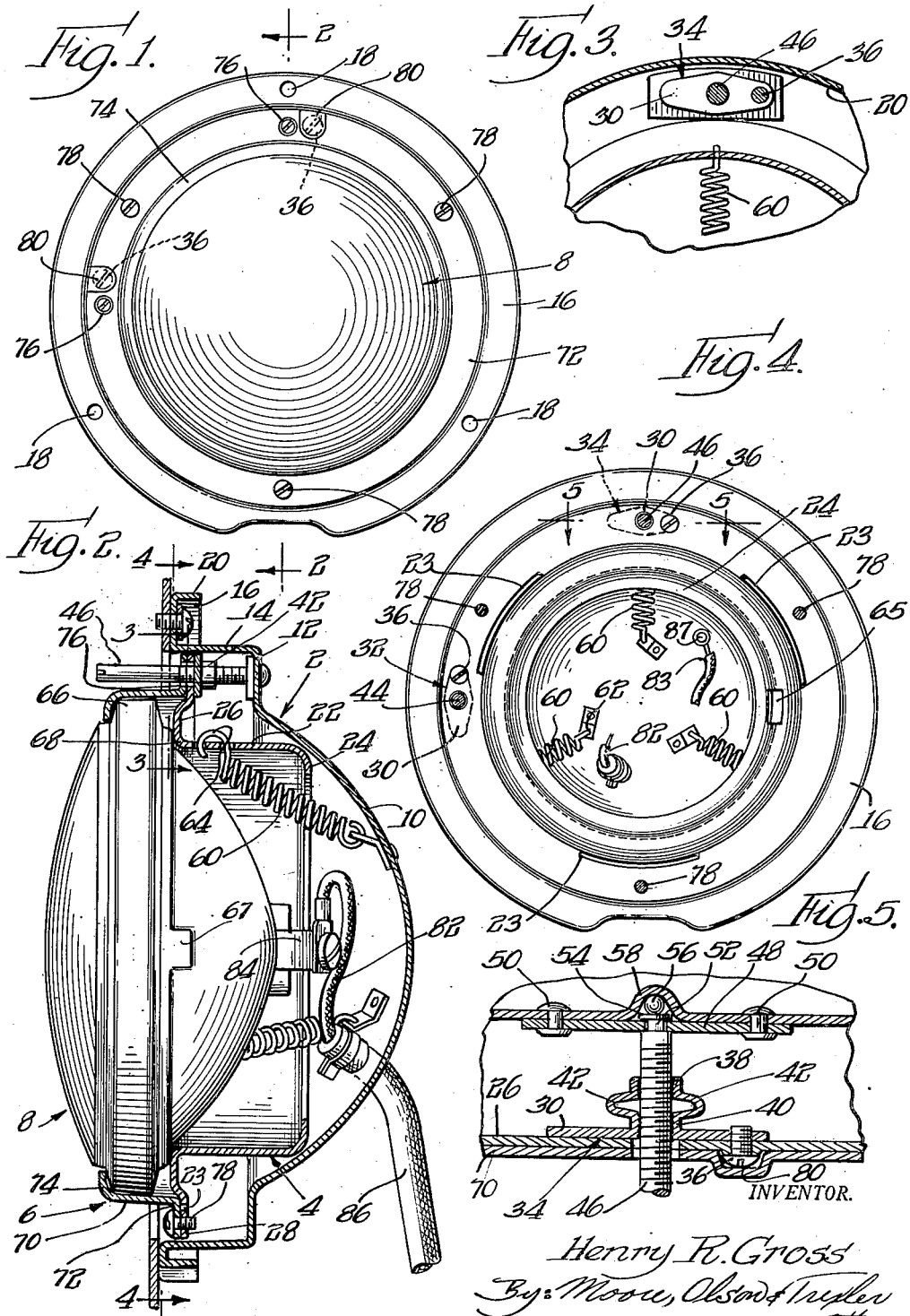

Patented Apr. 18, 1950

2,504,327

UNITED STATES PATENT OFFICE 2,504,327

LAMP MOUNTING

Henry R. Gross, Chicago, Ill.

Application November 14, 1947, Serial No. 785,938

9 Claims. (Cl. 240—44)

This invention relates to a lamp mounting, and more particularly to the mounting structure for a sealed beam, automobile fog lamp.

It is an object of the invention to provide a simple, relatively inexpensive, yet rugged mounting structure for a sealed beam lamp unit whereby the unit may be readily mounted in the fender of streamlined, present day models of automobiles and yet is so constructed that the sealed beam unit may be readily removed and replaced.

Sealed beam lamp units are provided with mounting beads which are not of uniform dimension from lamp to lamp, but vary slightly, and conventional mounting clamps therefore frequently cause breakage of the lamp unit. It is, therefore, a principal object of the invention to provide a mounting structure for a sealed beam lamp unit with sufficient yieldability to accommodate without breakage the different bead thicknesses, and to provide for the application of equalized stresses to the frangible parts of the lamp unit due to shock, irregularities of size, temperature changes and whatever cause.

Another, principal object of the invention is to provide a sealed beam mounting structure by means of which the vertical and horizontal positioning of the light beam may be adjusted externally of the lamp unit so that adjustment thereof may be accomplished in a matter of seconds without requiring disassembly or detachment of any portion of the lamp unit.

A further object of the invention is to provide a sealed beam mounting structure wherein the rear annular bead engaging clamp for the lamp unit is provided with a peripheral attaching portion to which the front clamp clampingly is secured and the rear clamp and peripheral portion are so constructed as to be relatively yieldable so that lamp units of different bead thicknesses may be accommodated, without breakage, by the front clamping means and the rear clamp.

Other and further objects and advantages of the invention will be apparent from the following description when taken in connection with the accompanying drawing wherein:

Fig. 1 is a view in vertical face elevation of a sealed beam mounting unit embodying the invention;

Fig. 2 is an enlarged view in vertical section taken substantially along the line 2—2 of Fig. 1;

Fig. 3 is a fragmentary view in vertical section taken along the line 3—3 of Fig. 2;

Fig. 4 is a view in front elevation of the mounting unit of Fig. 1 with the sealed beam and the front clamping ring removed, taken as indicated by line 4—4 of Fig. 2;

Fig. 5 is an enlarged fragmentary view in horizontal section taken substantially along the line 5—5 of Fig. 4.

A preferred embodiment of a lamp mounting unit constructed in accordance with the present invention comprises a stamped sheet metal external housing shell 2, an internal shell 4 adjustably secured to and resiliently mounted in the housing 2 and an external clamping ring 6 cooperating with the internal shell 4 resiliently to secure the sealed beam unit 8 in fixed position in the shell 4.

The sheet metal housing 2 is stamped to form a dish-shaped central portion 10 merging into a rear radial flange 12 in turn merging into a forwardly extending longitudinally directed flange 14 connecting the rear radial flange 12 to a forward, radial flange 16 provided with suitable apertures 18 to receive mounting screws, bolts or other fasteners by means of which the housing shell 2 is fixed to the auto fender or fender bracket. The flange 16 is provided with a rearwardly rolled edge or flange portion 20 for strengthening purposes and to facilitate the mounting of the housing shell in the opening of the fender or fender bracket.

The inner sheet metal shell 4 is stamped into the form of a ring or drum 22 having an inwardly turned or rolled edge 24 strengthening the ring or drum flange 22 and providing an open back to the shell 4. The ring or drum flange 22 merges into an annular forward radial abutment flange 26 forming a rear clamping ring surface for the sealed beam lamp unit 8.

Said abutment flange, in turn, terminates at its outer annular edge into an offset outer support flange 28. The flange 28 is made yieldable in respect to the support flange 26 to accommodate lamp units of different bead thicknesses and to compensate for irregularities of size and shape in the parts by providing a plurality of arcuate slits 23 at the junction of the flange 26 with the flange 28. These flanges will therefore yield in a general direction axially of the lamp unit to accommodate lamp beads of greater than normal thicknesses and to preclude irregular and concentrated stresses being impressed upon the bezel while yet firmly in cooperation with the clamping ring 6, secure the lamp unit. The forward flange 26 merges into a rearwardly offset radial flange 28 which forms a mounting flange for the shell 4 and snugly interfits with the shell 2 and also an attachment flange for mounting the forward clamping ring 6.

The internal shell 4 is supported on and secured to the lateral arms 30 of sheet metal brackets or nut structures 32 and 34, as by screws 36 received in suitable unthreaded openings in the flange 28 of the shell 4 and in complementary threaded openings in one of the lateral arms 30 of each of the nut structures 32 and 34. The nut structures 32 and 34 are preferably formed to provide axially spaced nut sections 38 and 40 joined by resilient looped portions 42 by compression of which the threaded sections 38 and 40 may be axially displaced after threading so that the nut sections exert a frictional locking action against inadvertent turning of an adjusting screw 44 or 46 threaded into the nut structure.

The adjusting screws 44 and 46 are mounted on or secured to the rear radial flange 12 of the external housing shell 2 in angularly spaced relationship of approximately 90 degrees so that the bracket or nut structures 32 and 34 form, in effect, only a partial or floating mount for the internal shell 4.

The adjusting screws 44 and 46 are each mounted on a plate or strap 48, Fig. 5, fastened as by rivets 50 to the shell 2. Each adjusting screw is formed at its inner end with a reduced portion 52 loosely received in an opening in the strap 48 and an enlarged end portion 54 which retains the adjusting screw against axial movement relative to the strap 48. Each screw is journaled on a roller 56 housed in a depression 58 in the flange 12 of the housing shell 2. Each adjusting screw is assembled with its strap 48 prior to the riveting of the strap to the housing shell and for that purpose the opening in the strap to receive the screw is preferably made in the form of a "key slot," one end of which is larger than the end portion 54 of the screw to permit introduction of the screw into the slot. Removal of the screw out of such slot after the strap 48 has been riveted to the housing shell is prevented by the engagement of the end portion 54 of the screw with the inner wall surface of the depression 58 in the housing shell. The inner shell 22 is resiliently mounted or "floated" by means of three coil springs 60, each secured at one end to a clip or lug 62 fastened to the dish-shaped section 10 of the external housing shell. The opposite hook shaped end 64 of each spring 60 is received in spaced openings of the drum flange 22 of the inner shell 4 as illustrated in Fig. 2. It should be noted that the internal shell 4 is provided with an opening 65 substantially diametrically opposite to the adjusting screw 44 and extending partially across the flange 26 and inwardly partially along the drum flange 22 to receive the conventional locating lug 67 of the lamp unit 8.

The sealed beam lamp unit 8 is of conventional structure having a central, enlarged rim portion or bead 66 and a rear radial flange portion or surface 68 which bears against the forward surface of the radial ring portion 26 of the internal shell 4. The bead or flange 66 constitutes a mounting flange and the forward clamping ring 6 is formed with a longitudinal or drum flange 70, a rear outwardly extending radial flange 72 and a forward rolled edge 74 which forms a ring clamping flange engaging the forward surface of the mounting bead or flange 66 of the sealed beam lamp unit. The rear radial flange 72 is provided with a pair of openings 76 to permit passage of the adjusting screws therethrough, and a plurality of openings receiving screws 78 threaded into complementary openings in the offset radial flange 28 of the internal shell 4.

It should be noted that the threaded openings in the flange 28 for receiving the screws 78 are located in the regions of the arcuate slits 23 so that when the screws 78 are threaded into the openings to tighten the ring 6 the flange 28 may in these regions yield as a further accommodation for different thicknesses of bead 66. These arcuate slits, in accordance with the invention set forth, are preferably cut simultaneously with shaping of the shell 22 so that the shaping of the part and the formation of the resilient holding surfaces are provided in a single forming operation.

Forwardly extending offset portions or depressions 80, Figs. 1 and 5, permit the flange 72 of the clamping ring 6 to be secured in flush relation with the offset radial flange 28 of the inner shell notwithstanding the projection of the heads of the screws 36.

It should be noted that the adjusting screws project forwardly from the radial flange of the clamping ring 6 in close juxtaposition to the drum flange 70 of the ring 6 and project beyond the plane of the forward edge of the ring so that the slotted ends of a screw driver for adjusting the adjusting screws without interference from, or striking of the clamp ring.

The lamp unit 8 is preferably of the two-wire type, one of the wires 82 being secured at one end to the terminal clip 84, and the other wire 83 being connected to the corresponding other terminal clip of the lamp unit. One of the wires, as for example the wire 82, extends from the terminal clip 84 into the usual insulating sleeve or tube 86 which projects into the housing 2 through a suitable opening in the dish-shaped section 10. The other wire extends from a second terminal clip, similar to the clip 84, to a pin or rivet 87 which grounds the wire to the shell 2. The springs 60 resiliently pull or urge the inner shell 4 inwardly of the external shell or housing 2 and cause a portion or all of the circumferential area of the rolled rim 24 of the inner shell to rest upon or float in the dish-shaped section 10 of the external housing shell, depending upon the adjustment of the screws 44 and 46.

It will be evident that adjustment of the screw 46 in a direction to move the nut structure or bracket 34 forwardly lowers the beam by causing the inner shell to roll at its rear rolled edge 24 in a counterclockwise direction, as seen in Fig. 2, while adjustment of the screw in the opposite direction to cause an inward movement of the nut or bracket 34 raises the beam by rotating the lamp unit 8 in a clockwise direction. Similarly, it will be evident that adjustment of the screw 44 in a direction to cause outward movement of the nut structure or bracket 32 swings the beam to the right, causing rotation of the shell 4 within the shell 10 by rotating the lamp unit 8 about a substantially vertical axis. Similarly, it will be evident that adjustment of screw 44 in the opposite direction to move the bracket and nut structure 32 inwardly will move the beam to the left.

It should be noted that by reason of this construction the sealed beam lamp unit 8 may readily be removed by simply first removing the attaching screws 78 by which the forward lamp clamping ring 6 is secured to the radial flange 28 of the inner shell 4 and then, after pulling of the lamp out of the inner shell, detaching the supply wires 82 and 83 from the terminal strips. A replacement unit is readily inserted by first connecting the wires 82 and 83 to the terminal strips 84 of the replacement unit, then inserting the sealed beam lamp unit into the inner shell 4 and securing the front forward clamping ring to the inner shell by insertion of the attaching screws 78.

It should be specifically noted that this structure permits removal and replacement of the sealed beam unit without changing the focus which is determined solely by the angular position of the inner shell 4 with respect to the axes of the outer shell. It should also be specifically noted that this structure permits ready adjustment of the height and lateral position of the light beam without the removal of any part of the lamp mounting structure and from a position outside the fender in which the whole structure may be mounted.

It will be apparent from the foregoing description that I have provided a simple, relatively inexpensive, yet rugged mounting structure for a sealed beam lamp unit whereby the unit may be readily mounted in the fender of streamlined present day models of automobiles and yet is so constructed that the sealed beam unit may be readily removed and replaced.

I have also provided a sealed beam mounting structure by means of which the vertical and horizontal positioning of the light beam may be adjusted externally of the lamp unit so that adjustment thereof may be accomplished in a matter of seconds without requiring disassembly or detachment of any portion of the lamp unit.

It will be obvious that changes may be made in the form, construction and arrangement of the parts without departing from the spirit of the invention or sacrificing any of its advantages, and the right is hereby reserved to make all such changes as fairly fall within the scope of the following claims.

Having thus described the invention, what is claimed as new and desired to be secured by Letters Patent is:

1. In a lamp structure for mounting a sealed beam lamp unit having an annular mounting bead, a sheet metal shell having an annular body portion for receiving the body of the lamp unit and a radial clamping flange to engage the rear surface of the mounting bead of the lamp unit, a clamping ring having a rear radial flange, and cooperable fastening means for securing the radial flange of the clamping ring to the radial clamping flange of the sheet metal shell, said fastening means including a yieldable section of the radial clamping flange of the sheet metal shell partially separated from the rest of the sheet metal by slots cut in said flange to promote yieldability, said clamping ring being provided with an annular flange extending forwardly therefrom to encompass the mounting bead of the lamp unit, and an inturned flange at the forward end thereof to engage the forward surface of the mounting bead of the lamp unit.

2. In a lamp structure for mounting a sealed beam lamp unit having an annular mounting bead, a sheet metal shell having an annular body portion for receiving the body of the lamp unit and a radial clamping flange to engage the rear surface of the mounting bead of the lamp unit, a clamping ring having a rear radial flange, and cooperable fastening means for securing the radial flange of the clamping ring to the radial clamping flange of the sheet metal shell, said fastening means including a yieldable section on one of said flanges made yieldable by slots cut in said flange, said clamping ring being provided with an annular flange extending forwardly therefrom to encompass the mounting bead of the lamp unit, and an inturned flange at the forward end thereof to engage the forward surface of the mounting bead of the lamp unit.

3. In a lamp structure for mounting a sealed beam lamp unit having an annular mounting bead, a sheet metal shell having an annular body portion for receiving the body of the lamp unit and a rear radial flange, said flange comprising an inner section engaged by the rear surface of the mounting bead of the lamp unit and an outer support section, arcuate slots formed in said flange between said sections providing resiliency therebetween, and a clamping ring having a rear radial flange secured to the outer section of the radial flange of the sheet metal shell, said clamping ring being provided with an annular flange extending forwardly to encompass the mounting bead of the lamp unit, and an inturned flange at the forward end thereof to engage the forward surface of the mounting bead of said lamp unit.

4. In a lamp structure for mounting a sealed beam lamp unit having an annular mounting bead, a sheet metal shell having an annular body portion for receiving the body of the lamp unit and a rear radial flange, said flange comprising an inner section engaged by the rear surface of the mounting bead of the lamp unit and an outer support section, arcuate slots formed in said flange between said sections providing resiliency therebetween, said outer section being offset rearwardly in respect to said inner section and said slots being formed along the line of offset between said sections, and a clamping ring having a rear radial flange secured to the outer section of the radial flange of the sheet metal shell, said clamping ring being provided with an annular flange extending forwardly to encompass the mounting bead of the lamp unit, and an inturned flange at the forward end thereof to engage the forward surface of the mounting bead of said lamp unit.

5. The method of making a sheet metal support shell for a sealed beam lamp unit which comprises forming an annular body portion on said shell for receiving the body of the lamp unit, forming an inner abutment flange on said shell for engaging and positioning the lamp unit, forming an offset support flange on said shell outwardly of the abutment flange, and forming a plurality of spaced arcuate slots between the abutment flange and the support flange, said several forming actions being effected by a single forming operation.

6. In a lamp structure, a cup-shaped mounting shell for receiving the body portion of a sealed beam lamp unit, said shell having a first annular flange portion for clamping engagement with the rear flange of the bead of such lamp unit, a second annular flange portion integrally joined to the first flange portion at spaced intervals but extending radially therebeyond, said outer annular flange portion having portions yieldable relative to said inner flange portion to permit said flange portions to yield relative to one another, and a clamping ring for engaging the forward flange of the bead of such lamp unit, said clamping ring having a rear annular flange for abutting engagement with the outer annular flange portion of the mounting shell, and means for securing the rear flange of the clamping ring to the outer annular flange portion of the mounting shell in the region of greatest relative yieldability.

7. In a lamp structure, a mounting shell, a second shell adapted to receive the lamp unit, a lamp unit having a frangible rim, resilient means securing the second shell to the mounting shell and forming a floating mount for the second shell, rotary adjusting means carried by one of the shells bearing on a spherical bearing member and abutting the other shell to adjust the second shell angularly relatively to the mounting shell to swing the beam from the lamp unit up and down and from right to left and means yieldably clamping the rim of the lamp unit to said second shell.

8. In a lamp structure, an outer mounting shell, an inner shell detachably receiving a sealed beam lamp unit, adjusting screws secured in angularly spaced relation to the outer shell abutting a spherical bearing member and passing through and beyond the inner shell in laterally spaced relation to a lamp unit mounted in the inner shell, a nut on each of said screws and abutting the inner shell, springs each secured at one end to the inner surface of the outer shell and at its other end to the inner shell to urge the shells toward each other in relative angular position as determined by the rotational adjustment of said screws.

9. In a lamp structure, the combination of a housing, a lamp unit having a peripheral flange, means for resiliently mounting said lamp unit relatively to said housing including a shell having an annular abutment against which said lamp unit is clampingly supported and having an outstanding annular flange and turnable adjusting posts turnably mounted on said housing abutting a spherical bearing member secured in said housing and threadedly engaging said flange for tilting said lamp unit with respect to said housing, the forward ends of said posts extending outwardly exteriorly of said lamp unit and adjacent the periphery thereof.

HENRY R. GROSS.

REFERENCES CITED

The following references are of record in the file of this patent:

UNITED STATES PATENTS

| Number | Name | Date |
|---|---|---|
| 2,067,722 | Mead et al. | Jan. 12, 1937 |
| 2,159,871 | Worden et al. | May 23, 1939 |
| 2,219,143 | Wharam | Oct. 22, 1940 |
| 2,246,808 | McKechnie | June 24, 1941 |
| 2,266,329 | Mead et al. | Dec. 16, 1941 |
| 2,293,222 | Sheldrick et al. | Aug. 18, 1942 |
| 2,304,311 | Luce | Dec. 8, 1942 |